US011467830B2

(12) United States Patent
Deadman et al.

(10) Patent No.: US 11,467,830 B2
(45) Date of Patent: Oct. 11, 2022

(54) METHOD OF TESTING ONE OR MORE COMPUTE UNITS (71) Applicant: Arm Limited, Cambridge (GB)

(72) Inventors: Bernard Deadman, Austin, TX (US); Michael Allen, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/163,138

(22) Filed: Jan. 29, 2021

(65) Prior Publication Data
US 2022/0244956 A1 Aug. 4, 2022

(51) Int. Cl.
*G06F 9/30* (2018.01)
*G06N 3/08* (2006.01)
*G06F 11/22* (2006.01)
*G06F 11/10* (2006.01)
*G06F 9/345* (2018.01)
*G06F 11/27* (2006.01)

(52) U.S. Cl.
CPC ........ *G06F 9/3001* (2013.01); *G06F 9/30101* (2013.01); *G06F 9/30134* (2013.01); *G06F 9/345* (2013.01); *G06F 11/1004* (2013.01); *G06F 11/22* (2013.01); *G06F 11/27* (2013.01); *G06N 3/08* (2013.01)

(58) Field of Classification Search
None
See application file for complete search history.

(56) References Cited

U.S. PATENT DOCUMENTS 4,866,715 A * 9/1989 Van Meerbergen .. G06F 7/5338
714/742
4,876,660 A * 10/1989 Owen ..................... G06F 7/544
708/603
(Continued)

FOREIGN PATENT DOCUMENTS

EP 0141744 A2 * 5/1985 .......... G06F 11/2273
EP 3920099 A1 * 12/2020 .............. G06N 3/04
JP 2006258654 A * 9/2006

OTHER PUBLICATIONS

'What's an LFSR?' by Texas Instruments, SCTA036A, Dec. 1996. (Year: 1996).*
(Continued)

*Primary Examiner* — Steven G Snyder
(74) *Attorney, Agent, or Firm* — EIP US LLP (57) ABSTRACT

A processor is described that includes a plurality of compute units. One or more test pattern generators generates one or more test patterns and inputs the one or more test patterns into one or more of the plurality of compute units during testing, which testing includes processing of the one or more test patterns by one or more of the plurality of compute units. One or more control and sequencing logic units identifies an idle period during normal use of the processor in which a compute unit of the plurality of compute units is idle. The one or more control and sequencing units controls the test pattern generator to generate and input the one or more test patterns to the idle compute unit and controls the compute unit to process the one or more test patterns during the idle period. One or more comparators compares a result of testing with an expected result of testing to determine if the compute unit is functioning correctly.

11 Claims, 7 Drawing Sheets

(56) References Cited

U.S. PATENT DOCUMENTS

| | | | | |
|---|---|---|---|---|
| 5,600,658 | A | * | 2/1997 | Qureshi ......... G01R 31/318321 |
| | | | | 714/724 |
| 5,960,009 | A | * | 9/1999 | Gizopoulos ......... G06F 11/2226 |
| | | | | 714/744 |
| 7,707,472 | B1 | * | 4/2010 | Dastidar ................ G11C 29/32 |
| | | | | 714/733 |
| 8,799,713 | B2 | * | 8/2014 | Gangasani .............. G06F 11/27 |
| | | | | 714/30 |
| 2005/0260963 | A1 | * | 11/2005 | Ponce De Leon ..... H04B 17/20 |
| | | | | 455/226.3 |
| 2012/0226942 | A1 | * | 9/2012 | Gangasani .............. G06F 11/27 |
| | | | | 714/30 |
| 2021/0390324 | A1 | * | 12/2021 | Balasubramaniyan ...................... |
| | | | | G06K 9/6262 |

OTHER PUBLICATIONS

'A Survey on Multiply Accumulate Unit' by Priyanka A. Patil et al., copyright 2018, IEEE. (Year: 2018).*

'Structured Computer Organization' by Tanenbaum, pp. 10-11, copyright 1984 by Prentice-Hall, Inc. (Year: 1984).*

'Boundary-Scan Chain Design for Testability' by Corelis, archived on Jun. 9, 2019. (Year: 2019).*

'The Design of Easily Testable VLSI Array Multipliers' by Shen and Ferguson, IEEE Transactions on Computers, Jul. 1984. (Year: 1984).*

* cited by examiner

METHOD OF TESTING ONE OR MORE COMPUTE UNITS

BACKGROUND OF THE INVENTION

Field of the Invention

This invention relates to a processor and a method of testing one or more compute units.

Description of the Related Technology

Neural networks are finding increased use in a wide variety of applications, with one of many applications being in the automotive sector. Convolutional neural networks (CNN) are being used to provide object detection and classification capabilities in real-time. The detection and classification of objects may be used as a safety feature to provide alerts to avoid vehicle collision and may be used in various techniques for driving automation or driver assistance. Given that these CNN applications are integral to the safety of vehicle occupants and road users, ensuring proper functioning of the processor that processes input data through a neural network is vital.

A neural processing unit (NPU) may contain several compute engines, which are adapted for performing certain operations, such as multiplier accumulate operations. Within each compute engine, there may be a number of compute units, each of which contains hardware for performing, for example, multiplier and accumulation functions.

Given the complexity of automotive CNN applications, carrying out tests without requiring the CNN engine be taken off-line is difficult. Additionally, the compute engines used for these tasks may contain thousands of compute units. In many cases these large arrays of compute units must be tested, without taking the CNN engine off-line, with a high fault identification rate within a defined time period.

In view of these requirements, an efficient, effective method of performing self-test protocols during normal functioning of the CNN engine is desirable.

SUMMARY

According to a first aspect there is provided a processor, comprising: a plurality of compute units; one or more test pattern generators configured to generate one or more test patterns and input the one or more test patterns into one or more of the plurality of compute units during testing to generate a test pattern solution, which testing includes processing of the one or more test patterns by the one or more of the plurality of compute units; one or more control and sequencing logic units, configured to identify at least one idle period during use of the processor in which a compute unit of the plurality of compute units is deemed to be idle, to control a test pattern generator to generate and input test data to the compute unit, the test data including at least a portion of the one or more test patterns, and control the compute unit to process the test data during the idle period; and one or more comparators configured to compare the test pattern solution, with an expected test pattern solution.

According to a second aspect there is provided a method, performed by a processor, of testing one or more compute units of a plurality of compute units of the processor, the method comprising: identifying, using a control and sequencing logic unit, an idle period of a compute unit of the plurality of compute units in which the compute unit is deemed to be idle; generating, using one or more test pattern generators, one or more test patterns; inputting test data to the compute unit, the test data including at least a portion of the one or more test patterns; the compute unit processing the test data during the idle period; generating a test pattern solution based on processing of the test pattern by one or more of the compute units over at least one idle period; and comparing an expected test pattern solution and the generated test pattern solution.

BRIEF DESCRIPTION OF THE DRAWINGS

Embodiments will now be described with reference to the accompanying figures in which.

DETAILED DESCRIPTION OF CERTAIN INVENTIVE EMBODIMENTS

Before discussing particular embodiments with reference to the accompanying figures, the following description of embodiments is provided.

A first embodiment describes a processor, comprising: a plurality of compute units, each comprising a multiplier and an adder; one or more test pattern generators configured to generate one or more test patterns and input the test patterns into each of the multiplier and adder within a compute unit of the one or more of the plurality of compute units, wherein the one or more test pattern generators is configured to generate one or more test patterns during testing to cause the compute unit to generate a test pattern solution, which testing includes processing of the one or more test patterns by at least one of the multiplier and adder within the compute unit of the one or more of the plurality of compute units to test the multiplier element and the adder element of the compute unit separately; one or more control and sequencing logic units, configured to identify at least one idle period during use of the processor in which the compute unit of the plurality of compute units is deemed to be idle, to control a test pattern generator to generate and input test data to at least one of the multiplier and adder within the compute unit, the test data including at least a portion of the one or more test patterns, and control at least one of the multiplier and adder within the compute unit to process the test data during the idle period; and one or more comparators configured to compare the test pattern solution, with an expected test pattern solution.

The plurality of compute units may form a compute engine of the processor. The processor may be a neural processing unit (NPU). The comparator may be any circuit capable of comparing a result of testing with an expected result of testing.

A test pattern generated by the one or more test pattern generators may comprise at least one of: a Linear-Feedback Shift Register (LFSR) code, a Cyclical Redundancy Check (CRC) check value. The structure of the one or more test patterns may be created by the one or more test pattern generator on demand or may be pre-stored in the one or more test pattern generator. The one or more test patterns may be generated as a signal or a sequence of signals and input into one or more of the plurality of compute units during testing.

The one or more test pattern generators may be configured to generate the expected result of testing and transmit the expected result of testing to the one or more comparators.

A separate test pattern generator and comparator may be provided for each compute unit.

In other embodiments, the one or more test pattern generator and one or more comparators may each serve a plurality of compute units.

The plurality of compute units may form part of an array of compute units. The array of compute units may be a systolic array.

In other embodiments the compute units may be configured to perform other operations, such as sigmoid, rectified linear (ReLu) or pooling operations.

The one or more control and sequencing logic units may be configured to control a compute unit of the plurality of compute units to process the test pattern over two or more idle periods.

The adder may be configured to perform an accumulate function. The processor may further comprise a storage, and the control and sequencing logic may be configured to temporarily store an accumulated value from the adder in the storage in a case that the compute unit is controlled to process a test pattern.

The processor may be configured to output a signal that indicates whether or not a fault is detected.

The one or more control and sequencing logic units may be configured to control compute units of the plurality of compute units to perform processing of a test pattern every time an idle period is identified. In other implementations, the one or more control and sequencing logic units may be configured to control compute units of the plurality of compute units to perform processing of a test pattern during idle periods so as to process a predetermined number of test patterns over a predetermined period of time. The one or more control and sequencing units may be configured to distribute the processing of test patterns by the compute units over the predetermined period of time.

A second embodiment may provide a method, performed by a processor, of separately testing an adder within one or more compute units of a plurality of compute units of the processor, each compute unit comprising a multiplier and the adder, the method comprising:

identifying, using a control and sequencing logic unit, an idle period of a compute unit of the plurality of compute units in which the compute unit is deemed to be idle; generating, using one or more test pattern generators, one or more test patterns; inputting test data directly from the one or more test pattern generators to the adder within the compute unit, the test data including at least a portion of the one or more test patterns; the adder within the compute unit processing the test data during the idle period; generating a test pattern solution based on processing of the one or more test patterns by the adder within one or more of the compute units over at least one idle period; and comparing an expected test pattern solution and the generated test pattern solution.

Particular embodiments will now be described, with reference to the figures.

Figure 1:
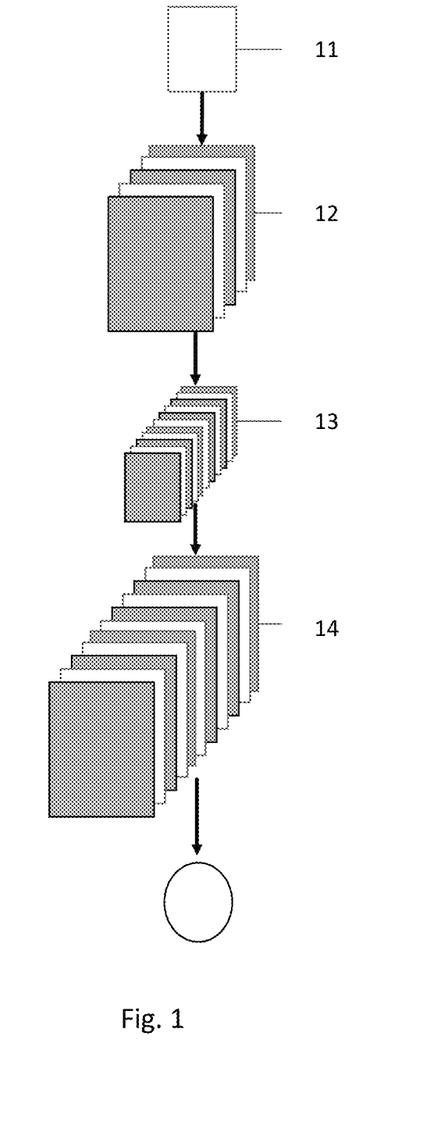
FIG. 1 is a schematic diagram showing a processing of a neural network.

Object detection and identification is an increasingly prevalent use for Convolutional Neural Networks (CNN). In particular, the YOLO v3(You Only Look Once) neural network is an example CNN that can be used to detect and identify objects in real time. FIG. 1 is a schematic diagram showing a simplified view of the stages of processing of a neural network running an object detection and identification neural network. Only a few stages of processing are illustrated in FIG. 1 and the number of layers and number of features will vary from neural network to neural network. The skilled person will appreciate that this is an example only, and that other neural networks, such as ResNet50, may be used in different contexts.

An input, such as an image, is received at input layer 11, and is processed through further layers 12, 13 and 14. At each layer, filters are applied to values in the preceding layer, with the effect varying in dependence on the filter applied. Filters may consist of a variety of operations, including but not limited to convolutional operations and pooling operations.

In the first layer 11, a first set of filters are applied to the input. At each subsequent layer 12, 13 and 14, the filters of that layer act on the feature maps generated from the previous layer. These feature maps are comprised of data, the amount of which may exceed a local memory capacity of a processor processing the neural network, meaning that at each layer 12, 13 and 14 the data that makes up the feature map from the previous layer may need to be written to and read from an external memory. Depending on the size of the feature map generated, the read and write operations associated with each layer will take a certain amount of time.

Depending on the type of neural network and the way that the processor processes the neural network, neural network may have convolutional neural network layers, fully connected layers, recurrent neural network layers, fused layers etc.

Figure 2:
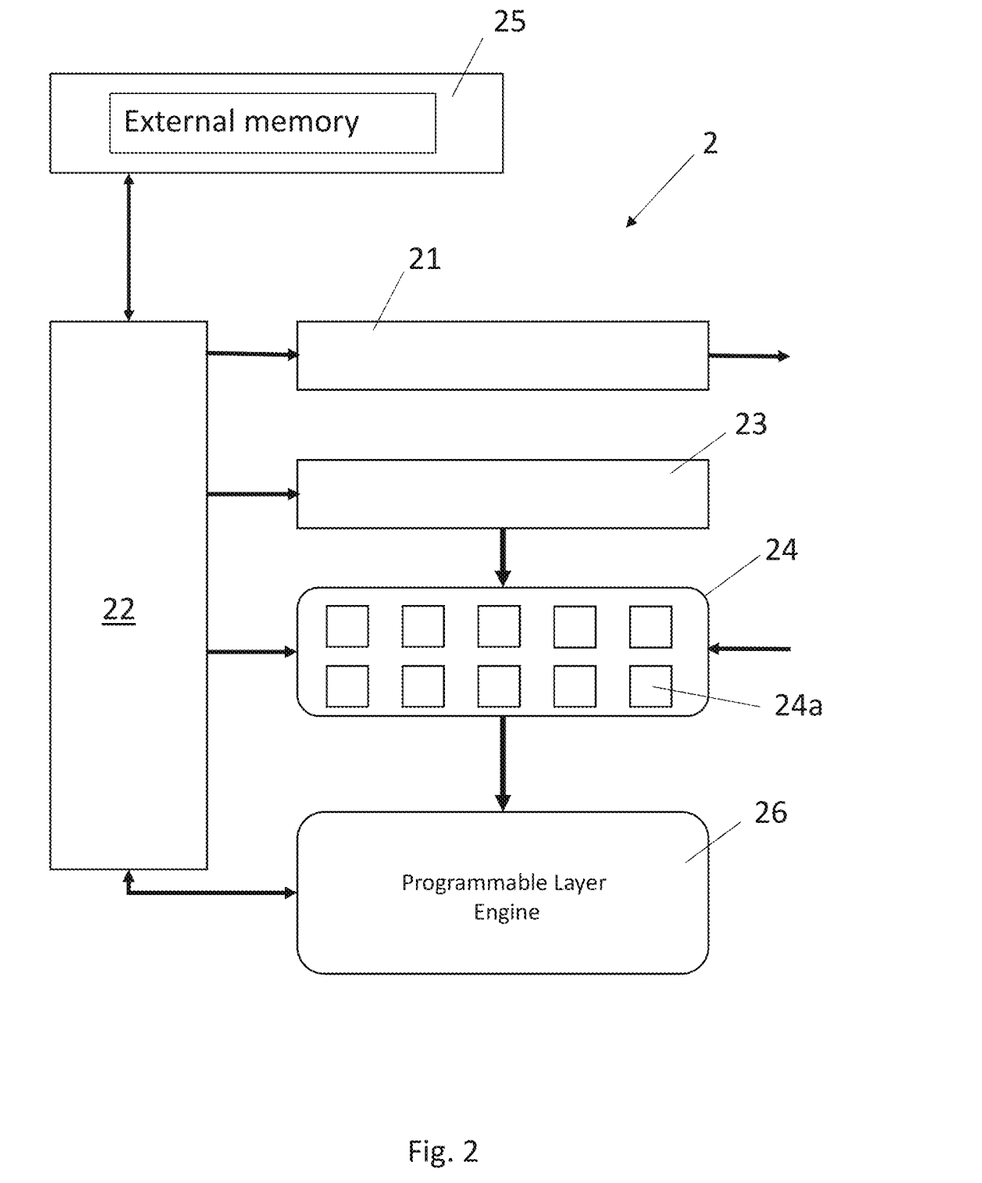
FIG. 2 is a schematic diagram showing structure of a neural processor.

FIG. 2 is a schematic diagram showing structure of a neural processor 2 of a type that would be used to perform calculations associated with a CNN as described above. Input activation reader 21 is configured to read a patch of an Input Feature Map (IFM) from cache memory 22. In some embodiments of the invention, a set of compressed weights to be applied to a given layer may be retrieved from cache memory 22, decompressed and read in by a weight decoder 23. The decompressed weights and the input data may be fed into a MAC Compute Engine (MCE) 24. The input data and weights data may need to be fetched from an external memory 25 into cache memory 22 before input activation reader 21 and weight decoder 23 can read them from cache memory 22.

MCE 24 is an element of the neural processor 2 that performs the core computational functions for the CNN. A processor may have many MCE 24, but for the sake of simplicity a single MCE is shown in FIG. 2. In order for the filters to be effectively and efficiently applied, the compute engine is able to quickly perform calculations related to processing of neural networks. A majority of the computational processing required for proper functioning of a CNN is to multiply two input values and accumulate the results. These operations are known as Multiply-Accumulate operations, or MAC operations, and are carried out by MAC units 24 located within the compute engine 24. CNN engines (MCE 24) may contain large arrays of MAC units 24a, for example 16,000 MAC units for a single MAC compute engine 24. The results from the MAC operations carried out in the MCE 24 are then input into a Programmable Layer Engine (PLE) 26. The PLE 26 is configured to refine and enhance the output of MCE 24 by performing further operations that may be programmed, thereby generating an Output Feature Map (OFM). This OFM is then written back to cache memory 22.

In typical neural networks, limitations on memory bandwidth mean that fetching weight parameters and input data for the processing of each layer takes a greater amount of time than the processing of the input data by MCE 24. Consequently, it is frequently the case that MCE 24, and therefore MAC units 24a contained within MCE 24, will sit idle for periods of time in which input activation reader 21 and weight decoder 24 are fetching data. There may also be periods of time in which some MAC units 24a are idle while other MAC units 24a are processing.

Figure 3:
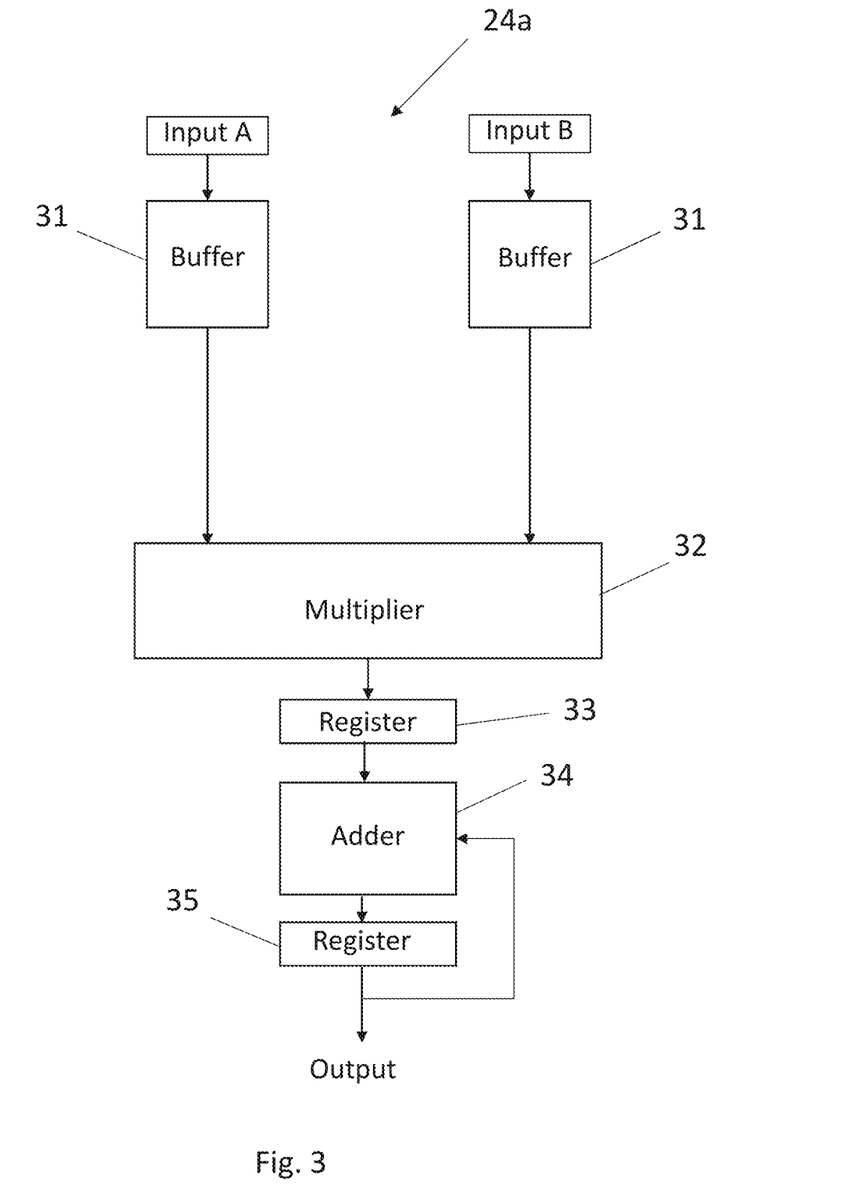
FIG. 3 shows a schematic diagram of a MAC unit within a CNN engine.

FIG. 3 shows a schematic diagram of a MAC unit 24a within a CNN engine. At the top of FIG. 3, inputs A and B—the input data and decompressed weights—are input through buffers 31. These inputs are passed to a multiplier 32. The multiplier 32 multiplies the input values together and returns a result. This result is then fed into register 33, which in turn inputs the multiplier result into full adder 34. The full adder 34 may, depending on the instructions received by the full adder 34 for a given input, perform an accumulate operation, which adds the multiplier result generated by multiplier 32 to previous results generated by the MAC unit 24a as a whole. In this way, the output generated by the MAC unit 24a in a given cycle is the sum of the product of the two inputs and the previous successive results.

The result generated by the adder 34 is then input into a further register 35. This register 35 stores the result generated by the MAC unit 24a and may then input this result back into the adder 34 during a subsequent operation. The result of the multiplier-accumulate function is output from the MAC unit 24a. Control logic for controlling the adder and output of the multiplier-accumulate function is provided but is not described in detail here as it is not relevant.

As indicated above, each MAC unit 24a will likely have idle periods during normal operation of the compute engine in executing the CNN. During these idle periods, no inputs are provided to MAC unit 24a.

Figure 4:
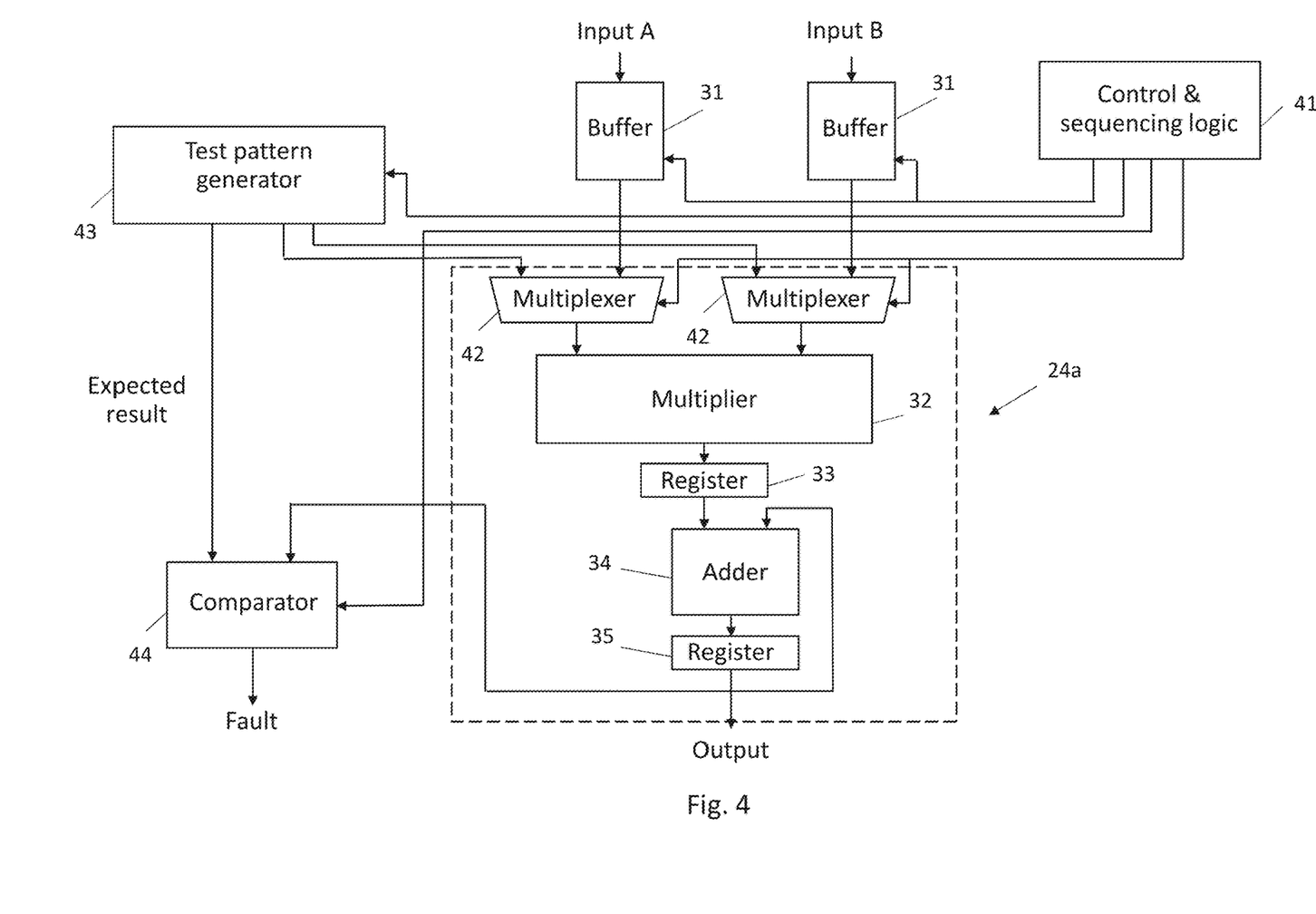
FIG. 4 illustrates Built-In Self-Test applied to a MAC unit.

FIG. 4 shows a schematic diagram of a first particular embodiment of a Built-In Self-Test (BIST) applied to a MAC unit 24a of the type shown above. In the depicted arrangement, a control and sequencing logic unit 41 is connected to the pair of input buffers 31, as well as to the control lines of a pair of input multiplexers 42 and the test pattern generator 43. The pair of input multiplexers 42 are provided between the buffers 31 and the multiplier 32.

The control and sequencing logic unit 41 is configured to detect and identify periods in which the MAC unit 24a is idle, i.e. periods in which no other inputs are being provided to MAC unit 24a. Upon detecting such an idle period, control unit 24a may instruct test pattern generator 43 to generate a test pattern, which test pattern generator then inputs the test pattern to the input multiplexers 42. It should be noted that 'generate' in this context means to create a signal including the test pattern. The actual form of the text pattern may either be created by the text pattern generator 43 on demand or may be pre-stored on the test pattern generator 43. A pair of multiplexers 42 are controlled by the control and sequencing logic unit 41 to select the test pattern input line and forward it to the output lines of the multiplexers. The test pattern generated by test pattern generator 43 is therefore input into multiplier 32 of MAC unit 24a.

In some implementations, the test pattern generator 43 may be a Linear-Feedback Shift Register (LFSR). An LFSR uses a series of flip-flops known as 'taps,' the outputs of which are fed through one or more XOR logic gates to produce a primitive polynomial, which are then used to generate pseudo-random test patterns.

The input generated by test pattern generator 43 is then processed by MAC unit 42a as described previously—the relevant inputs are multiplied and then accumulated as required by the normal operation of MAC unit 42a. MAC unit 42a thereby generates a test result in the form of a test pattern solution. In this first particular embodiment, this test pattern solution is passed to a comparator 44. In other embodiments described further below, the test pattern solution from the multiplier 32 and adder 34 may be input into subsequent MAC units.

In the first particular embodiment, the test pattern generator 43 also transfers an expected result to comparator 44. This expected result is the test pattern solution that should be generated by multiplier 32 and adder unit 34 from the test pattern generated by test pattern generator 43, provided that MAC unit 24a is operating as intended. In other embodiments, the expected result may be stored in a memory element connected to comparator 44.

The test pattern solution generated by the multiplier 32 and adder 34 from the test pattern generated by test pattern generator 43 and the expected result are collected at comparator 44. Comparator 44 analyses the result and the solution and compares them. If the two match, MAC unit 24a is determined to be operating properly. If the two do not match, this indicates a fault in MAC unit 24a, and comparator 44 will output a positive fault determination. Faults in FLOPs (floating point operations), in storage such as the buffers 31 or registers 33 and 35, and data transfers can generally be detected using this technique.

The skilled person will appreciate that the methods of testing described above are not exhaustive, and that any known practical means of generating a test pattern and comparing a circuit-provided solution thereto with an expected result may be used. These may for example include the use of a Cyclical Redundancy Check (CRC) or Cellular Automatons (CA).

Figure 5:
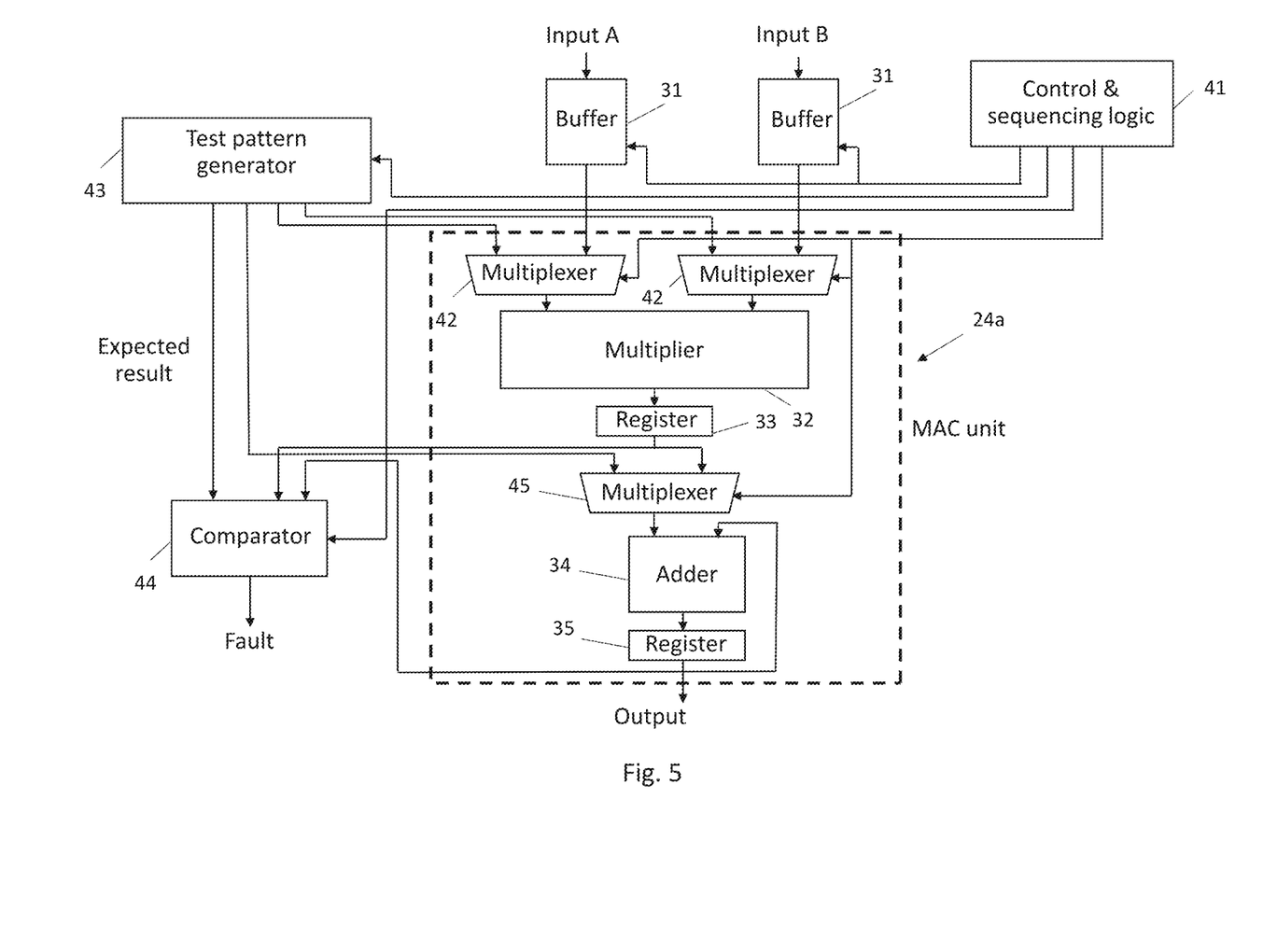
FIG. 5 illustrates a variant of Built-In Self-Test applied to a MAC unit.

In a variation of the first particular embodiment in which the adder 34 and multiplier 32 are not required to be tested in combination, shown in FIG. 5, the multiplier 32 and the adder 34 may be tested separately—this may reduce the number of self-test cycles required to test these components. In such embodiments, test pattern generator 43 is configured so as to be able to input a test pattern into the multiplier 32 and adder 34 separately, with comparator 44 configured to receive test pattern solutions from each. An additional multiplexer 45 is provided between the multiplier 32 and the adder 34. The additional multiplexer 45 is connected to the test pattern generator 43 and is controllable by the control and sequencing logic 41 to introduce the test pattern directly into the adder 34.

For processors that need to meet ASIL standards, it is not necessary that a full self-test be carried out during each period in which the MAC unit 24a is idle. It may be sufficient that the combined number of self-test operations completed across a plurality of idle periods meets or exceeds a pre-determined combined coverage goal within a pre-determined allowable fault detection time. Accordingly, in some implementations, the calculation for a self-test may be completed across a plurality of idle periods. In this case, a partial self-test (in other words part of the self-test calculation) is completed in each of the idle periods.

The MAC units 24a described above with the BIST can run a self-test independently of and/or in parallel with other MAC units 24a in the processor. In some implementations, each test pattern generator 43 may use the same test pattern and same expected results.

There are several strategies that may be used for conducting self-tests across an array of MAC units 24a. One approach is to conduct a self-test during each cycle in which each MAC unit 24a is idle. This has the advantage of maximizing coverage of the self-tests at the expense of increased power dissipation.

A second approach is to execute a minimum number of self-tests in order to meet a coverage goal, such as a goal specified in a relevant standard. In the second approach a number of cycles required to achieve the desired coverage goal is predicted and the self-tests are controlled by the control and sequencing logic 41 to be spread across waiting times expected to be available between processing channels of an output feature map of a neural network. The second approach may minimize peak power and average power by evenly distributing power dissipation over time.

A third approach is to execute a number of self-test cycles required to achieve a desired coverage goal, as with the second approach, but without attempting to distribute the self-tests. The third approach minimizes overall power consumption and evenly distributes power dissipation over time.

The particular embodiments described here all relate to the testing of Multiplier Accumulator units. However, the techniques described herein may be applied to other computational elements used in neural network processing. A substantially similar approach—using a control and sequencing logic unit to identify and determine idle periods for a computational unit, control a test pattern generator to generate and input a test pattern into the computational unit, and comparing the generated solution with an expected result—may be applied to other mathematical operations and transformations, such as sigmoid, rectified linear (ReLu) and pooling operations. Certain implementations will be designed so that coverage goals are achievable within the available clock cycles.

The technique described above may offer improvements over other alternative techniques. For example, a dual core lock step (DCLS) approach could be adopted in which a redundant copy of the MAC units is provided, and the outputs of the MAC units are compared against each other. A cost of this approach is that it requires substantially more silicon area in order to introduce the redundant copy, possibly occupying fifty to one hundred present more area than a processor without the checks.

Another technique that the above embodiment can be compared to is that of using an operating system to take the MAC compute engine off-line, perform a hardware self-test and, if the MAC compute engine passes the self-test, bring the MAC compute engine back online. This has a cost that the MAC compute engine needs to be taken completely off-line making it unavailable for processing. The combination of self-test duration and the required self-test interval may result in the need to over provision MAC compute engines within a processor in order to compensate for the self-test requirements.

Second Particular Embodiment—Multiple MAC Units

Figure 6:
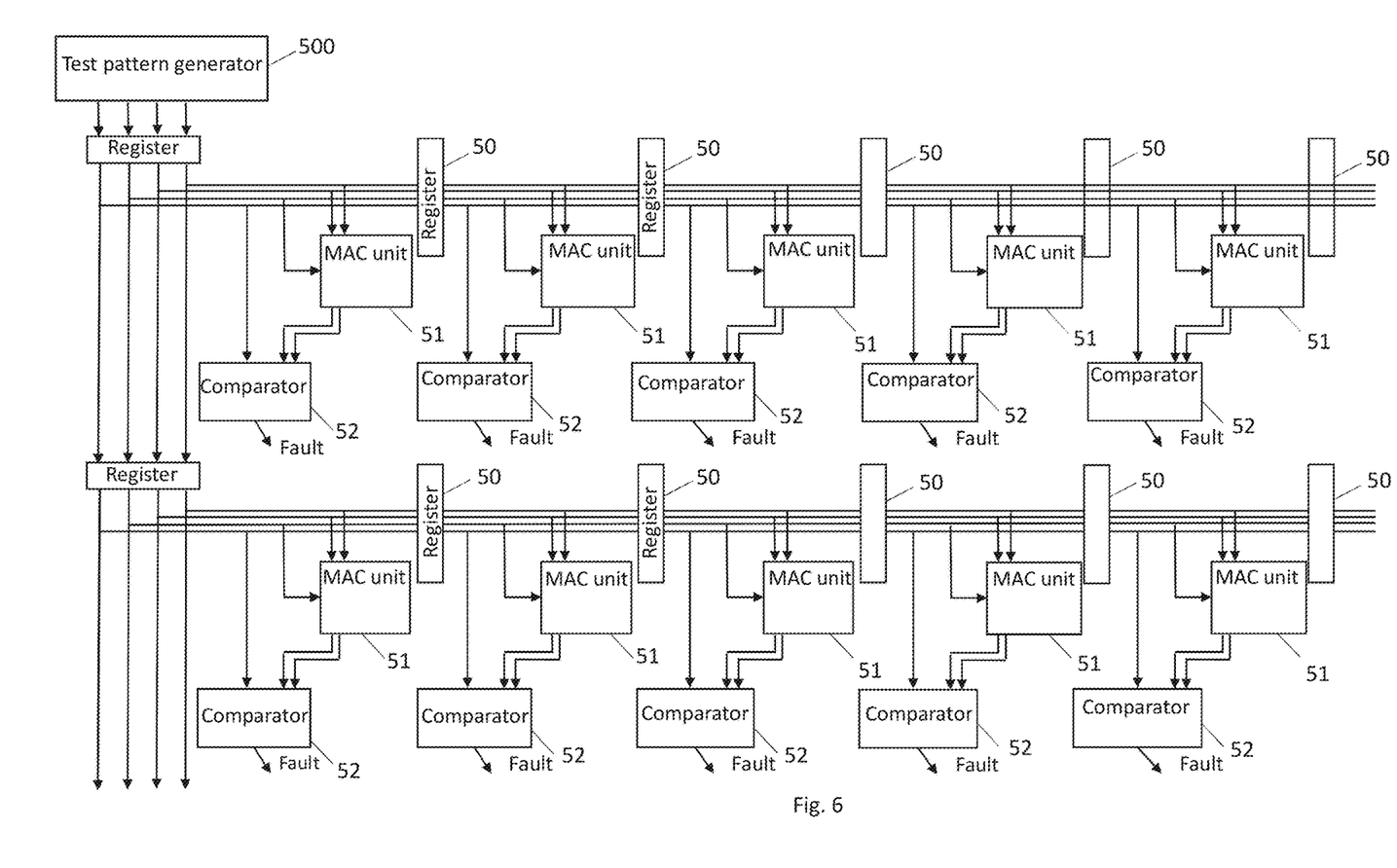
FIG. 6 is diagram showing an array of MAC units with a single test pattern generator.

In the first particular embodiment described above, implementation of the BIST has included a separate test pattern generator connected to each MAC unit. While this may be effective, as noted above compute engines in processors frequently contain very large MAC arrays. This being the case, for each MAC unit 24a in the array to have a dedicated test pattern generator may be expensive in terms of hardware. Consequently, in a second particular embodiment, a single test pattern generator 500 may be configured to generate a single test pattern and to input this single test pattern into a plurality of MAC units 51 in an array.

FIG. 6 is diagram showing an array of MAC units 51 with a single test pattern generator 500. In this embodiment, as above, a control and sequencing logic unit (not pictured) detects and identifies an idle period for each MAC unit 51 in the array. The idle period may be the same for all MAC units 51 in the array, or may differ between MAC units 51. If the idle period is the same, the test pattern generated by test pattern generator 500 will be input into each MAC unit 51 at the same clock cycle. If the idle period is different, the test pattern will be held in a register 50 corresponding to each MAC unit, with a control unit instructing register 50 to input the test pattern into the corresponding MAC unit when an idle period for that MAC unit is detected.

In this embodiment, while a single test pattern generator 500 is configured to generate and input a single test pattern to a plurality of MAC units 51 connected in an array, each MAC unit 51 is served by a separate comparator 52. Therefore, once the test pattern generated by test pattern generator 500 has been processed by each MAC unit 51, the comparator 52 attached to each MAC unit 51 will collect the test pattern solution generated by the corresponding MAC unit 51 from the test pattern generated by test pattern generator 500 and the expected result, and compare the two. As above, if the two do not match, the corresponding MAC unit 51 is determined to be malfunctioning, and comparator 52 will output a positive fault indicator.

Third Particular Embodiment—Single Comparator Multiple Unit

Figure 7:
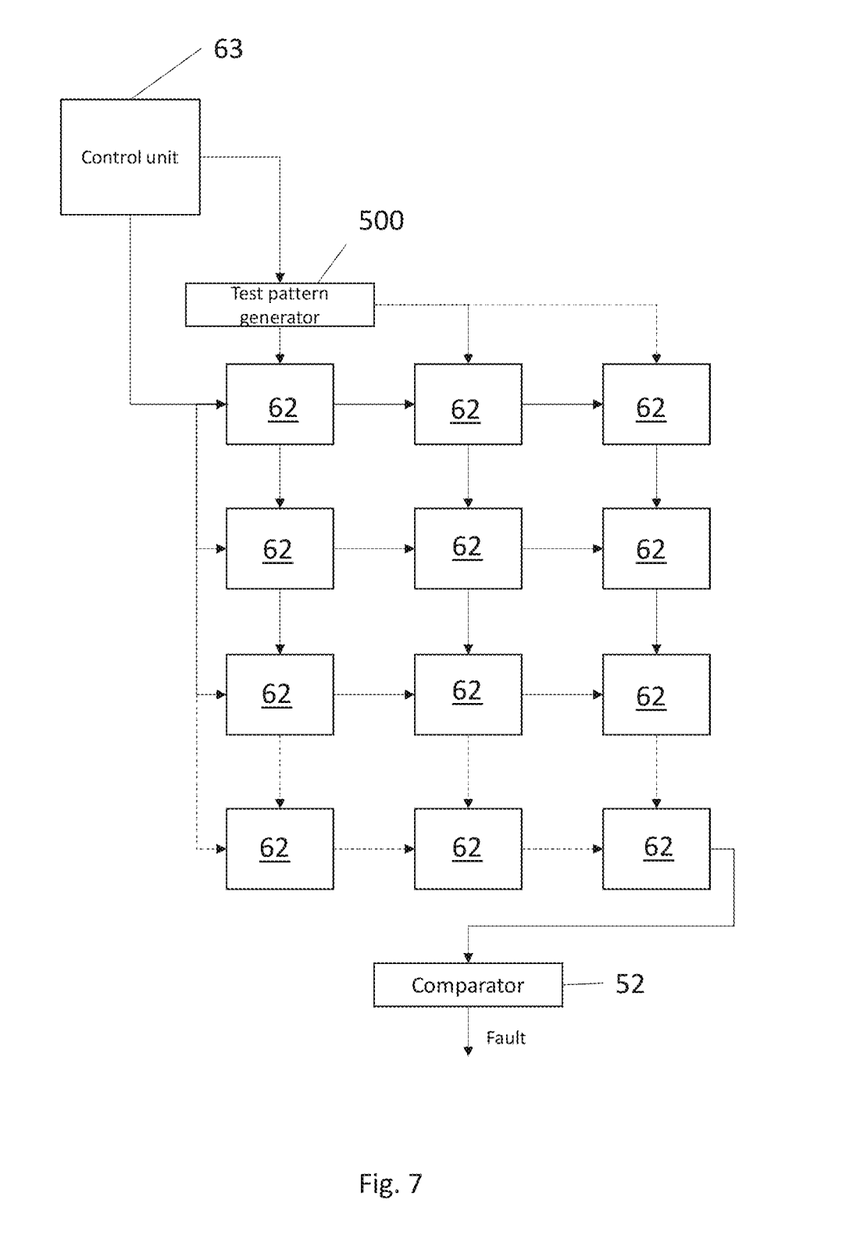
FIG. 7 is a schematic diagram of a MAC engine including a systolic array of MAC units, a single test pattern generator and a comparator.

In a third particular embodiment, a plurality of MAC units 51 are connected in a systolic array and may be tested by use of a single test pattern generator and a single comparator. A single test pattern may be input into a first MAC unit, with the test pattern solution generated by the first MAC unit is used as an input for subsequent MAC units.

FIG. 7 is a schematic diagram of a MAC engine including a systolic array of MAC units, a single test pattern generator 500 and a comparator 52.

In FIG. 7, a test pattern generator 500 is connected to MAC units 62, which form a systolic array. A systolic array, as understood in the art, is a network of compute units, in this case MAC units 62, that receive a set of parallel inputs, each compute unit generating a partial result as a function of data received from preceding compute units and passing this result to subsequent units, this repeating until a final output result is generated.

As in previously described particular embodiments, in FIG. 7 a control and sequencing logic unit 63 detects and identifies an idle period for a first MAC unit 62 connected in systolic array. Once this idle period is detected, control unit 63 instructs test pattern generator 500 to generate a test pattern and to input the test pattern into a first MAC unit 62 connected in a systolic array. Test pattern generator 500 does so, and first MAC unit 62 processes the test pattern, generating a test pattern solution.

Unlike in previous particular embodiments, in this embodiment the test pattern solution generated by first MAC unit 62 is not passed to a comparator. Instead, it is forwarded to subsequent MAC units 62 in turn, and is input into these subsequent MAC units. The skilled person will appreciate that although FIG. 6 illustrates the solution generated by first MAC unit 62 being forwarded to two subsequent MAC units, this embodiment is not limited to this example, and that the number of MAC units 62 to which this solution is passed is entirely dependent on the layout and construction of the compute array of a given application.

Subsequent MAC units 62 generate, based on the input of the first test pattern solution generated by first MAC unit 62, further test pattern solutions, which are in turn input into further MAC units. This process repeats, with each subsequent MAC unit in the array generating a test pattern solution based on inputs of previous test pattern solutions from preceding MAC units. Once all MAC units in the array have generated a test pattern solution, this will result in a final output from the final MAC unit 62. This final output comprises a final test pattern solution.

Once the final test pattern solution has been generated, it will be collected at comparator 52, along with the expected result generated by test pattern generator 500. Comparator 52 then compares the expected result with the final test pattern solution. As in previous particular embodiments, if the expected result and final test pattern solution match, all MAC units 62 connected in the array are functioning as intended. If the two do not match, at least one MAC unit connected in the array has a fault, and comparator 52 will output a positive fault indicator.

In the first and second particular embodiments, it is assumed that the values in the test pattern solution generated by MAC unit 24a are compared to the expected result cycle-by-cycle. In an alternative implementation of the third particular embodiment, a Multiple-Input Signature Register (MISR) or CRC calculator is used in the test pattern generator 500 to compute a signature or check value that is the result of a test pattern being processed by multiple MAC units 62. In this embodiment, the output bits comprising the test pattern solution generated by processing of the test pattern generated by the array of MAC units 62 generates a function known as a signature that can be compared to the expected signature from the test pattern generator 500 by comparator 52. This approach may achieve the same coverage goals while reducing the required number of comparators, register bits and power required to distribute the expected result in a MAC array.

The array described above in the third particular embodiment is an application of the concept of an 'output stationary systolic array' of MAC units. However, other implementations may make use of other arrays of MAC units or arrays of other types of processing units.

The above particular embodiments assume that, when the MAC unit is in use and processing data relating to a neural network, the input data is buffered so that all data is available to process for each channel of the neural network without interleaving self-test cycles. In other words, the self-test cycles are performed when the MAC unit 24a is idle and there is no value in the adder that shouldn't be disturbed. Further implementations may temporarily store accumulated values from the adder in a local parity-protected register during a test-cycle and restore the values at the end of each group of test cycles. In this way test cycles and normal functional cycles of the MAC unit 24a may be freely interleaved.

What is claimed is:

1. A processor, comprising:
   a plurality of compute units each comprising a multiplier and an adder;
   one or more test pattern generators configured to generate one or more test patterns and input the one or more test patterns into each of the multiplier and adder within a compute unit of the one or more of the plurality of compute units, wherein the one or more test pattern generators is configured to generate one or more test patterns during testing to cause the compute unit to generate a test pattern solution, which testing includes processing of the one or more test patterns by at least one of the multiplier and adder within the compute unit of the one or more of the plurality of compute units to test the multiplier element and the adder element of the compute unit separately;
   one or more control and sequencing logic units, configured to identify at least one idle period during use of the processor in which the compute unit of the plurality of compute units is deemed to be idle, to control a test pattern generator to generate and input test data to at least one of the multiplier and adder within the compute unit, the test data including at least a portion of the one or more test patterns, and control at least one of the multiplier and adder within the compute unit to process the test data during the idle period; and
   one or more comparators configured to compare the test pattern solution, with an expected test pattern solution.

2. A processor according to claim 1, wherein a test pattern generated by the one or more test pattern generators comprises at least one of: a Linear-Feedback Shift Register (LFSR) code, a Cyclical Redundancy Check (CRC) check value.

3. A processor according to claim 1, wherein the one or more test pattern generators is configured to generate the expected result of testing and transmit the expected result of testing to the one or more comparators.

4. A processor according to claim 1, wherein a separate test pattern generator and comparator are provided for each compute unit.

5. A processor according to claim 1, wherein the one or more test pattern generator and one or more comparators each serve a plurality of compute units.

6. A processor according to claim 1, wherein the plurality of compute units form part of an array of compute units.

7. A processor according to claim 1, wherein the one or more control and sequencing logic units are configured to control a compute unit of the plurality of compute units to process the test patterns over two or more idle periods.

8. A processor according to claim 1 wherein the adder is configured to perform an accumulate function, the processor further comprises a storage, and the control and sequencing logic is configured to temporarily store an accumulated value from the adder in the storage in a case that the compute unit is controlled to process a test pattern.

9. A processor according to claim 1, wherein the one or more control and sequencing logic units is configured to control compute units of the plurality of compute units to perform processing of a test pattern every time an idle period is identified.

10. A processor according to claim 1, wherein the one or more control and sequencing logic units is configured to control compute units of the plurality of compute units to perform processing of a test pattern during idle periods so as to process a predetermined number of test patterns over a predetermined period of time.

11. A method, performed by a processor, of separately testing an adder within one or more compute units of a plurality of compute units of the processor, each compute unit comprising a multiplier and the adder, the method comprising:
- identifying, using a control and sequencing logic unit, an idle period of a compute unit of the plurality of compute units in which the compute unit is deemed to be idle;
- generating, using one or more test pattern generators, one or more test patterns;
- inputting test data directly from the one or more test pattern generator to the adder within the compute unit, the test data including at least a portion of the one or more test patterns;
- the adder within the compute unit processing the test data during the idle period;
- generating a test pattern solution based on processing of the one or more test patterns by the adder within one or more of the compute units over at least one idle period; and
- comparing an expected test pattern solution and the generated test pattern solution.

* * * * *